(No Model.)

C. H. GAFFNEY.
BALL CASTER.

No. 545,858.  Patented Sept. 3, 1895.

Witnesses.
Lauritz N. Möller.
Samuel J. Craddock.

Inventor
Charles H. Gaffney
by Alban Andrew
his atty.

UNITED STATES PATENT OFFICE.

CHARLES H. GAFFNEY, OF GLOUCESTER, MASSACHUSETTS, ASSIGNOR, BY DIRECT AND MESNE ASSIGNMENTS, TO THE CRESCENT AUTOMATIC CASTER COMPANY, OF MAINE.

BALL CASTER.

SPECIFICATION forming part of Letters Patent No. 545,858, dated September 3, 1895.

Application filed September 25, 1894. Serial No. 524,074. (No model.)

*To all whom it may concern:*

Be it known that I, CHARLES H. GAFFNEY, a citizen of the United States, and a resident of Gloucester, in the county of Essex and State of Massachusetts, have invented new and useful Improvements in Casters, of which the following, taken in connection with the accompanying drawings, is a specification.

This invention relates to improvements in ball-bearings for casters, and although particularly adapted for such purpose it is equally useful as an antifriction device for other purposes, if so desired.

The invention is carried out as follows, reference being had to the accompanying drawings, wherein—

Figure 1:
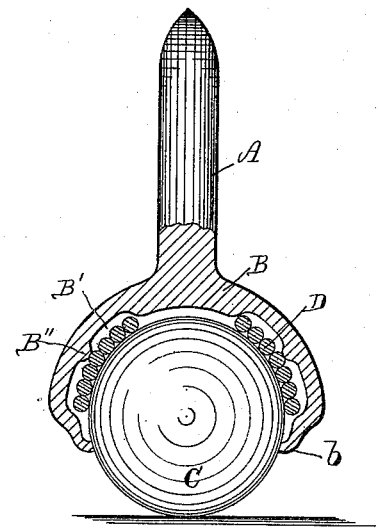
Figure 2:
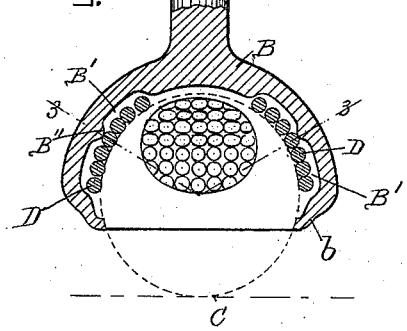
Figure 3:
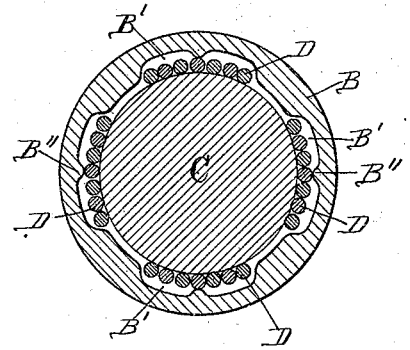
Figure 4:
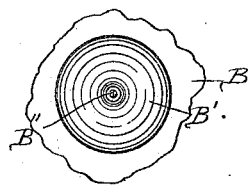

Figure 1 represents a central longitudinal section of the invention, showing the caster-ball in position within the socket. Fig. 2 represents a similar vertical section of the device, showing the caster-ball removed. Fig. 3 represents a horizontal section on the irregular line 3 3 in Fig. 2, showing the antifriction-balls in position; and Fig. 4 represents an interior view of one of the ball-containing pockets on the interior of the socket.

Similar letters refer to similar parts wherever they occur on the different parts of the drawings.

The invention is applicable for furniture, desks, pianos, or for other objects where an antifriction roller-bearing is required, and it is constructed as follows:

In the drawings, A represents the caster-spindle, made of metal, smooth or screw-threaded, for the purpose of attaching or securing it to the furniture, as may be desired. In one piece with the spindle A is made the semispherical socket B, adapted to receive the caster-ball C, as shown in Fig. 1.

*b* is an inwardly-bent annular lip or ring at the lower edge of the caster-socket B, which serves to retain the caster-ball C within the said socket after it has been placed therein and the said lip bent or crowded inward, as shown in Figs. 1 and 2. On the interior of the socket B and concentric with the caster-ball C are made a series of circular pockets or recesses B' B', in which are loosely arranged and contained the antifriction-balls D D D. Each of said pockets or recesses B' has a central curved projection B'', adapted to serve as a bearing and supporting-surface against the balls D in passing between said projection and the caster-ball C during the rotation of the latter. It will thus be seen that if, for instance, four pockets are made on the interior of the socket B, then the latter will be supported on four antifriction-balls D—namely, those that for the time being are located between the surface of the caster-ball C and the pocket projections B'' B'', as shown in Fig. 1.

If it is desired to have more than one ball in each pocket B'' bear against the caster-ball C, all that it is necessary to do is to provide each pocket B' with additional bearing projections B'', and I wish to state that I do not confine myself to the number of bearing projections B'' in the pockets B', as one or more may be used without departing from the essence of my invention.

In moving the furniture the caster-ball C is caused to rotate, and in so doing the small antifriction-balls D are automatically caused to move freely in the pockets B', and in so doing one after another serves as a roller-bearing in passing between the projection B'' and the caster-ball C, while the remaining antifriction-balls in each pocket B' are free to adjust themselves therein and serve to supply in turn rolling bearing-surfaces as they, one by one, pass by the projections B''. By this arrangement I obtain a most complete and practical antifrictional ball-bearing.

Having thus fully described the nature, construction, and operation of my invention, I wish to secure by Letters Patent and claim—

The herein described anti-friction roller bearing consisting of a substantially semi-spherical bracket having a spindle at its upper portion, and a socket at its lower portion, a caster-ball loosely retained in said socket, a plurality of circular pockets arranged in the bracket concentric with the caster-ball, a curved or rounded ball-bearing projection formed integral with and projecting from the bracket at the center of each pocket, and a series of balls loosely arranged in each of said pockets, said ball bearing projections acting on one of the balls in each pocket, substantially as described.

In testimony whereof I have signed my name to this specification, in the presence of two subscribing witnesses, on this 27th day of August, A. D. 1894.

CHARLES H. GAFFNEY.

Witnesses:
ALBAN ANDRÉN,
LAÜRITZ N. MÖLLER.